United States Patent
Irnich et al.

(10) Patent No.: US 10,033,508 B2
(45) Date of Patent: Jul. 24, 2018

(54) METHOD AND ARRANGEMENT FOR WHITE SPACE DEVICE TRANSMISSION

(75) Inventors: Tim Irnich, Neuss (DE); Jonas Kronander, Uppsala (SE); Yngve Selén, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1004 days.

(21) Appl. No.: 14/110,365

(22) PCT Filed: Apr. 8, 2011

(86) PCT No.: PCT/SE2011/050432
§ 371 (c)(1),
(2), (4) Date: Oct. 7, 2013

(87) PCT Pub. No.: WO2012/138272
PCT Pub. Date: Oct. 11, 2012

(65) Prior Publication Data
US 2014/0023031 A1    Jan. 23, 2014

(51) Int. Cl.
| H04L 5/00 | (2006.01) |
| H04W 16/14 | (2009.01) |
| H04W 72/08 | (2009.01) |

(52) U.S. Cl.
CPC .......... *H04L 5/0073* (2013.01); *H04W 16/14* (2013.01); *H04W 72/082* (2013.01)

(58) Field of Classification Search
USPC ......................................................... 370/329
See application file for complete search history.

(56) References Cited

U.S. PATENT DOCUMENTS

| 7,035,663 B1 | 4/2006 | Linebarger et al. |
| 8,213,874 B2 * | 7/2012 | Agnew ................. H04W 16/14 370/252 |

(Continued)

FOREIGN PATENT DOCUMENTS

WO    2010027308 A1    3/2010

OTHER PUBLICATIONS

Irnich, T. et al. "How Much TV White Space is There in Europe?" IEEE Int. Symp. New Frontiers in Dynamic Spectrum Access Networks, DySPAN, Aachen. May 2011. pp. 1-12.

*Primary Examiner* — Alpus H Hsu
*Assistant Examiner* — Hooman Houshmand
(74) *Attorney, Agent, or Firm* — Murphy, Bilak & Homiller, PLLC

(57) ABSTRACT

The disclosure relates to a white space device (WSD) of a secondary wireless network, and to a related method for transmitting a first signal on a channel available for secondary usage allocated to a primary wireless system. The method in the WSD comprises determining (410) a further channel used by the primary wireless system, that would be interfered by a transmission of the first signal on the channel available for secondary usage, retrieving (420) signal information associated with the determined further channel from the primary wireless system, transmitting (430) the first signal on the channel available for secondary usage, and transmitting (440) a second signal on the determined further channel based on the retrieved signal information, simultaneously with the first signal on the channel available for secondary usage* such that an interference generated in the primary wireless system by the first signal transmission is compensated for by the second signal transmission.

14 Claims, 7 Drawing Sheets

(56) References Cited

U.S. PATENT DOCUMENTS

| | | | |
|---|---|---|---|
| 8,279,356 B2* | 10/2012 | Shintani | H04N 5/38 348/734 |
| 8,473,989 B2* | 6/2013 | Bahl | H04L 27/0006 725/141 |
| 8,599,773 B2* | 12/2013 | Hsu | H04W 16/14 370/329 |
| 2005/0064860 A1* | 3/2005 | DeLine | G08C 17/02 455/420 |
| 2008/0134271 A1* | 6/2008 | Qin | H04W 52/50 725/118 |
| 2009/0286480 A1 | 11/2009 | Cho et al. | |
| 2010/0195590 A1* | 8/2010 | Park | H04W 74/0808 370/329 |
| 2010/0255794 A1* | 10/2010 | Agnew | H04W 16/14 455/77 |
| 2010/0309806 A1* | 12/2010 | Wu | H04H 20/423 370/252 |
| 2012/0096492 A1* | 4/2012 | Urban | H04W 16/14 725/39 |
| 2012/0096498 A1* | 4/2012 | Wu | H04L 5/003 725/81 |

* cited by examiner

METHOD AND ARRANGEMENT FOR WHITE SPACE DEVICE TRANSMISSION

TECHNICAL FIELD

The disclosure relates to white space device transmission. More particularly, the disclosure relates to a white space device and a method in the white space device for transmitting a signal on a channel available for secondary usage allocated to a primary wireless system, as well as to a control unit and a method in the control unit for supporting the white space device transmission.

BACKGROUND

The use of mobile broadband (MBB) services is rapidly increasing in all regions of the world as a result of the ongoing transition from cellular telephony to MBB. Mobile data surpassed voice during December 2009 and yearly traffic increases in the order of 200% to 300% have been measured in real networks. This increase is predicted to continue.

The mobile operators therefore face the challenge of handling an immense traffic increase in their networks. The required solutions on the radio side will likely be based on a combination of a deployment of spectrally efficient technologies, a densification of existing deployments, and an introduction of additional spectrum bands. Some examples of spectrally efficient technologies are the $3^{rd}$ Generation Partnership Project (3GPP) Long Term Evolution (LTE), which is a project to improve the Universal Mobile Telecommunication System (UMTS) standard, and later generations of High Speed Packet Access (HSPA). HSPA being a mobile telephony protocol that extends and improves the performance of existing UMTS protocols. There is a general agreement in industry, academia and regulatory bodies that more spectrum will be required for MBB services in the future.

One trend in radio research and regulation is based on the observation that many legacy systems provide an inefficient use of spectrum. A re-planning of such legacy systems could free up spectrum for licensed mobile use. Furthermore, significant efforts in research, standardization and regulation are spent on finding ways of getting higher spectrum utilization by means of secondary usage of said spectrum. A secondary user is in this context a user which is permitted to also use the spectrum e.g. for some other purpose than the legacy or primary system purpose, and that has well defined obligations to not cause harmful interference to the licensed, or primary, usage. The frequency range used by broadcast TV systems has become prime targets for secondary spectrum usage, and some regulatory bodies such as the Federal Communications Commission (FCC) in the US already have rules in place for secondary usage of TV bands. Other regulatory bodies have published suggestions for regulatory rules for consultation, such as the Electronic Communications Committee (ECC) within the European Conference of Postal and Telecommunications Administrations (CEPT) and the Ofcom in the UK. The main reason for the interest in the TV spectrum is that the spectrum is of high value to operators and that TV transmitters are stationary and predictable.

The presence of secondary users implies some sharing of spectrum bands between primary and secondary systems. Among the different possible sharing approaches, the interweave approach is the primary-secondary spectrum sharing approach which is probably the most commonly discussed in academia and elsewhere. In this approach the signals of the secondary systems are orthogonalized to the primary signals in time, frequency and/or spatial domain(s). This may be achieved, e.g., by letting the secondary systems communicate on time/frequency resources that are unused by primary systems. Another type of interweave is spatial/frequency orthogonalization where channels unused by the primary system at certain locations can be used by secondary systems.

TV white space is an example of this latter approach, schematically illustrated in FIG. 1. A primary TV transmitter 185a is operating on a particular channel N, and serves a primary service area 180 which is surrounded by a primary protection zone 181 in which no white space usage in that channel is allowed. Another primary TV transmitter 185b operating on channel with an associated service area 183 and protection zone 184, is also illustrated. Furthermore, a secondary LTE system 182 operating in a white space at channel N is illustrated. Secondary users in the LTE system may be referred to as white space devices (WSD). Channel N is thus a channel available for secondary usage by WSDs in the LIE system. Such a channel may also be referred to as a white space channel. The WSDs may be the LTE base stations, transmitting on channel N in the downlink, or user equipments (LIE) transmitting on channel N in the uplink. WSDs are thus devices that opportunistically use spectrum allocated for a primary system service on a secondary basis at locations—so called white spaces—where no primary system user is using the spectrum. The WSD is not allowed to cause harmful interference to the primary system service. Furthermore, the WSD is not protected from interference from any primary system service or user.

The fact that the white space is inside the primary protection zone 184 corresponding to channel N+k, may reduce the allowed transmit power for the WSD in the secondary system. Studies have shown that a big limitation for TV white space is the interference that the WSDs may cause to primary receivers, i.e. TV receivers, operating on channels other than that of the WSD. This problem will limit the WSDs output power, sometimes significantly, as will be explained hereinafter. As explained above with reference to FIG. 1, the WSD operating at channel N may be within the coverage area of TV transmitters operating on other frequency channels N+k, and is thus not allowed to operate on these other channels. It is in principle allowed to operate on channels used by other remote TV transmitters, as long as the WSD is located outside the primary protection zone of those transmitters, provided that the WSD limits its maximum transmit power below a value that would cause harmful interference to TV receivers. The allowed maximum WSD power is limited by the interference caused to TV receivers operating not only on the WSD channel, but also those operating on other channels. In the latter case the spatial distance between the WSD and a potentially interfered TV receiver can be very small, since the WSD could be located within the coverage area of the corresponding TV transmitter.

Since digital TV (DTV) receivers typically have limited frequency selectivity, as illustrated in FIG. 2, they are sensitive to WSDs operating even many channels away. FIG. 2 shows the protection ratio in dB as a function of the channel offset, FIGS. 3a-d show cumulative density functions that illustrate the amount of channels lost due to protection requirements on adjacent channels when using the white space rules proposed by the European CEPT SE-43 group, for different values of the Equivalent Isotropically Radiated Power (EIRP) of the WSD. FIGS. 3a and 3b illustrate the amount of allowed white space channels in Germany for two different types of WSDs when protecting TV receivers up to 10 channels away from the white space channel. The y-axis show the fraction of the surface of the country at which the number of channels on the x-axis or less are available. In FIG. 3a the amount of channels for a UE-like or portable WSD is shown, and in FIG. 3b the corresponding information is given for a base station-like or fixed WSD. From FIG. 3a it can be seen that a UE-like WSD with an EIRP level of 20 dBm have no available white space channels at all in over 30% of Germany's surface. In FIGS. 3c and 3d the corresponding results are shown when only TV receivers operating on the nearest adjacent channel to the potential white space channel are protected. Comparing these two sets of figures and the available white space shows that the amount of white space increases tremendously, in particular for the high power WSDs, when TV receivers operating several channels away from the white space channel are less protected from interference. If only TV receivers operating on the same channel as that of the WSD have to be protected, the amount of white space may increase even more.

It is clear from FIGS. 3a-d that the requirement on adjacent channel protection significantly limits the usable amount of white space channels, in particular for high WSD power levels. One way of removing these limits would be to regulate harder requirements for the digital TV receivers, e.g., such that only adjacent channel WSD interference affects the TV receivers. In this case the white space channel availability would be changed from that of FIGS. 3a-b to that of FIGS. 3c-d respectively. However, this would make TV receivers more expensive. Furthermore, it would require changing all TV receivers.

SUMMARY

An object is therefore to address some of the problems and disadvantages outlined above, and to reduce the transmit power limitations for white space usage due to the strict adjacent channel protection without making any changes to the primary, system receivers. This object and others are achieved by the methods and nodes according to the independent claims, and by the embodiments according to the dependent claims.

In accordance with a first aspect of embodiments, a method in a white space device of a secondary wireless system, for transmitting a first signal on a channel available for secondary usage allocated to a primary wireless system is provided. The method comprises determining a further channel used by the primary wireless system, that would be interfered by a transmission of the first signal on the channel available for secondary usage, and retrieving signal information associated with the determined further channel from the primary wireless system. The method also comprises transmitting the first signal on the channel available for secondary usage, and transmitting a second signal on the determined further channel based on the retrieved signal information. The second signal is transmitted simultaneously with the first signal on the channel available for secondary usage, such that an interference generated in the primary wireless system by the first signal transmission is compensated for by the second signal transmission.

In accordance with a second aspect of embodiments, a method in a control unit for supporting a white space device transmitting a first signal on a channel available for secondary usage allocated to a primary wireless system is provided. The method comprises receiving a request for accessing the channel available for secondary usage from the white space device. The request comprises at least one of: parameters for estimating the interference generated in the primary wireless system by the first signal transmission; parameters related to a transmitting capability of the white space device; and a desired transmit power level for the first signal transmission. The method also comprises determining information related to a further channel used by the primary wireless system, wherein the further channel would be interfered by the first signal transmission on the channel available for secondary usage. The information is determined based on the received request and on parameters related to the primary wireless system available in the control unit. The information comprises an identity of the further channel and a required transmit power level for a second signal transmission on the further channel. The method further comprises transmitting the determined information to the white space device.

In accordance with a third aspect of embodiments, a white space device configured to be used in a secondary wireless system, and to transmit a first signal on a channel available for secondary usage allocated to a primary wireless system is provided. The white space device comprises a processing unit configured to determine a further channel used by the primary wireless system, that would be interfered by a transmission of the first signal on the channel available for secondary usage. The processing unit is also configured to retrieve signal information associated with the determined further channel from the primary wireless system. The white space device further comprises a first transmitter for transmitting the first signal on the channel available for secondary usage, and a second transmitter for transmitting a second signal on the determined further channel based on the retrieved signal information, simultaneously with the first signal on the channel available for secondary usage, such that an interference generated in the primary wireless system by the first signal transmission is compensated for by the second signal transmission.

In accordance with a fourth aspect of embodiments, a control unit configured to support a white space device transmitting a first signal on a channel available for secondary usage allocated to a primary wireless system is provided. The control unit comprises a processing unit configured to receive a request for accessing the channel available for secondary usage from the white space device, the request comprising at least one of: parameters for estimating the interference generated in the primary wireless system by the first signal transmission; parameters related to a transmitting capability of the white space device; and a desired transmit power level for the first signal transmission. The processing unit is further configured to determine information related to a further channel used by the primary wireless system, wherein the further channel would be interfered by the first signal transmission on the channel available for secondary usage. The information is determined based on the received request and on parameters related to the primary wireless system available in the control unit. The information comprises an identity of the further channel and a required transmit power level for a second signal transmission on the further channel. The processing unit is also configured to transmit the determined information to the white space device.

An advantage of embodiments is that a WSD may transmit with a higher power than conventionally on a white space channel. Furthermore, it is a cost efficient way of reducing the problem of the strict adjacent channel protection for WSDs, as the primary system receivers need not be changed in any way.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1:
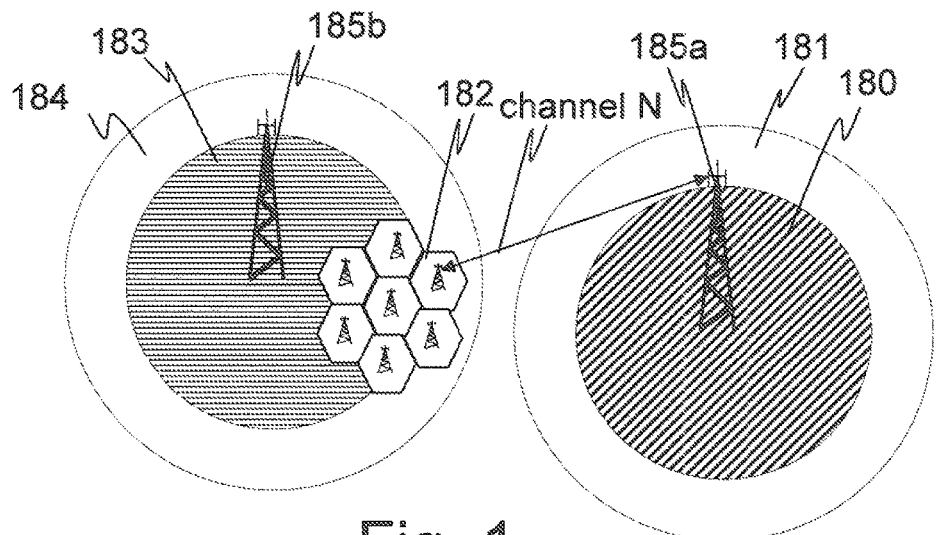
FIG. 1 illustrates a primary and a secondary system wherein embodiments may be implemented.

Embodiments are described herein by way of reference to particular example scenarios. Particular aspects are described in a non-limiting general context in relation to a primary system which is a DTV broadcast system operating in single frequency network (SFN) mode and a secondary system which is an LIE system, as illustrated in FIG. 1. However, the primary system may be any system in which the receivers benefit of receiving the desired signal over multiple signal propagation paths such as GSM, High Speed Packet Access (HSPA), LTE, WiMax, Wireless Local Area Network (WLAN), regular FM/AM radio, and Digital Audio Broadcast (DAB). The secondary system may be any other wireless system which is white space enabled, such as UMTS, cdma2000, WiFi, distance measuring equipment for aeronautical navigation purposes and radar systems. It should also be noted that there may be multiple primary systems to protect from interference in embodiments, e.g., operating on different although relatively nearby frequencies.

When a DTV system is operating in an SFN mode, the DTV signals may be transmitted in a synchronized manner from multiple DTV transmitters in a way that is transparent to the DTV receivers. The DTV receivers receive a signal which may consist of components from several transmitters and the resulting signal then looks like it has experienced a richer channel. The transmissions from different DTV transmitters will look like different channel taps.

In this disclosure, the problem of limited WSD transmit power due to strict requirements on adjacent channel protection, is addressed by a solution where a WSD is combined with a DTV SFN transmitter. When the WSD wants to transmit a signal on a white space channel allocated to the primary DTV system, the WSD determines one or more channels used by the primary DTV system that would be interfered by the first WSD signal transmission. The WSD then retrieves information from the DTV system regarding a DTV signal that is transmitted by the DTV system on the determined channel(s). The WSD transmits this DTV signal by using a DTV SFN transmitter in the WSD. The DTV signal is transmitted on the determined channel simultaneously with the signal transmission on the white space channel. In this way the interference caused by the signal transmission on the white space channel is less harmful to the primary DTV system, as it is compensated by the WSD's transmission of the DTV signal.

The WSD thus makes sure to also transmit a DTV signal on one or more limiting adjacent channels in such a manner that the interference caused at the primary receivers isn't harmful. By using the same antennas or closely located antennas the useful WSD signal and the DTV SFN signal experiences similar channels. The channels operate on different frequencies but will experience the same shadow fading or large scale fading. Thus, by, setting the appropriate power levels for the DTV transmission the interference levels experienced by the primary receivers relative to the received primary signal levels may be controlled by the WSD. By knowing what DTV channels that are the most affected by the WSD transmissions, the WSD can make sure to transmit the corresponding DTV signals on those channels only. Since the adjacent channel suppression in the DTV receivers is still decent the additional amount of power wasted on the DTV signal transmissions is low relative to the transmit power used for the WSD signals. The DTV channel selectivity is several tens of dBs as may be seen in FIG. 2 where the protection ratios for a non-zero channel offset are several tens of dBs below the 0 channel offset value. This means that the DTV SFN transmission will be tens of dBs lower than the WSD signal since the DTV receivers typically need a signal to noise ratio of some tens of dB. Hence the total output power will not be significantly affected. The described approach thus allows operation of WSDs with higher transmit power levels for the useful signal compared to when the WSDs are only transmitting on their white space channel.

Figure 2:
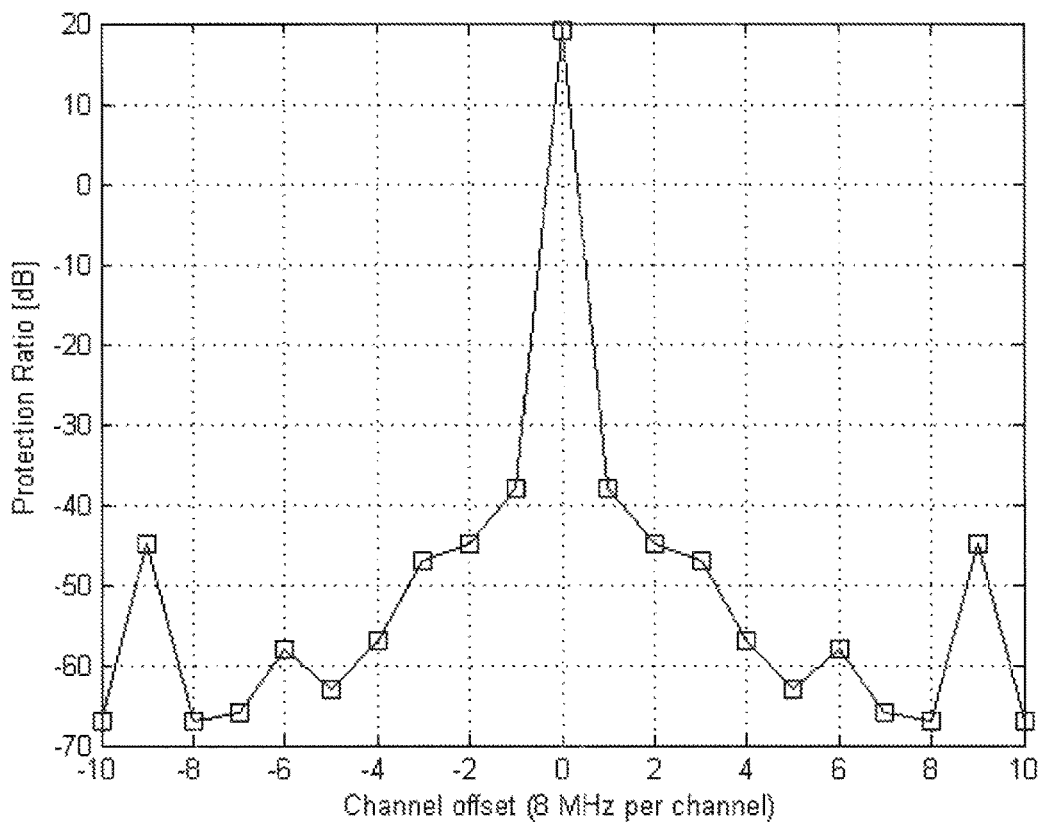
FIG. 2 is a diagram illustrating the limited frequency selectivity of a TV receiver.
Figures 3A, 3B:
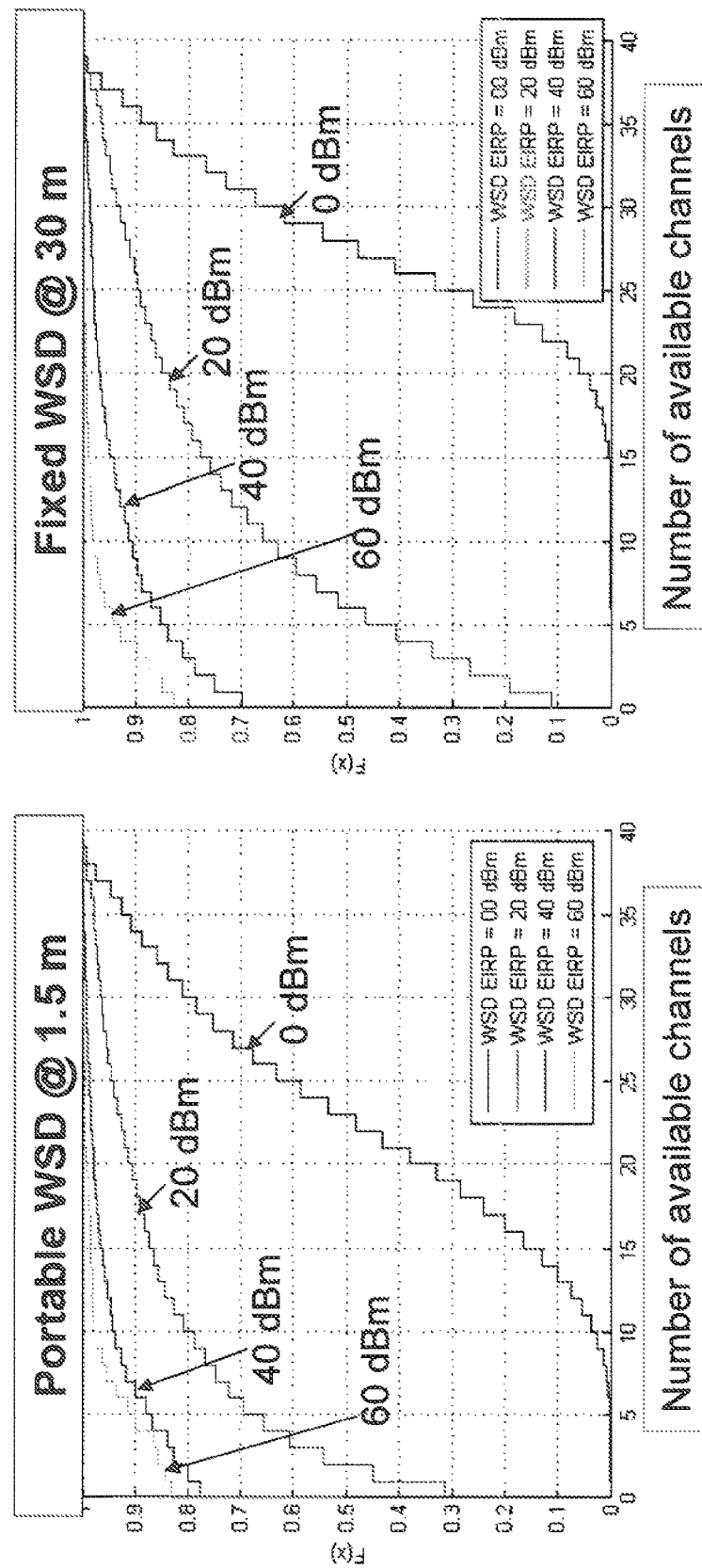
FIGS. 3a-d illustrate the amount of channels lost due to protection requirements on adjacent channels for different values of the EIRP of the WSD.
Figures 3C, 3D:
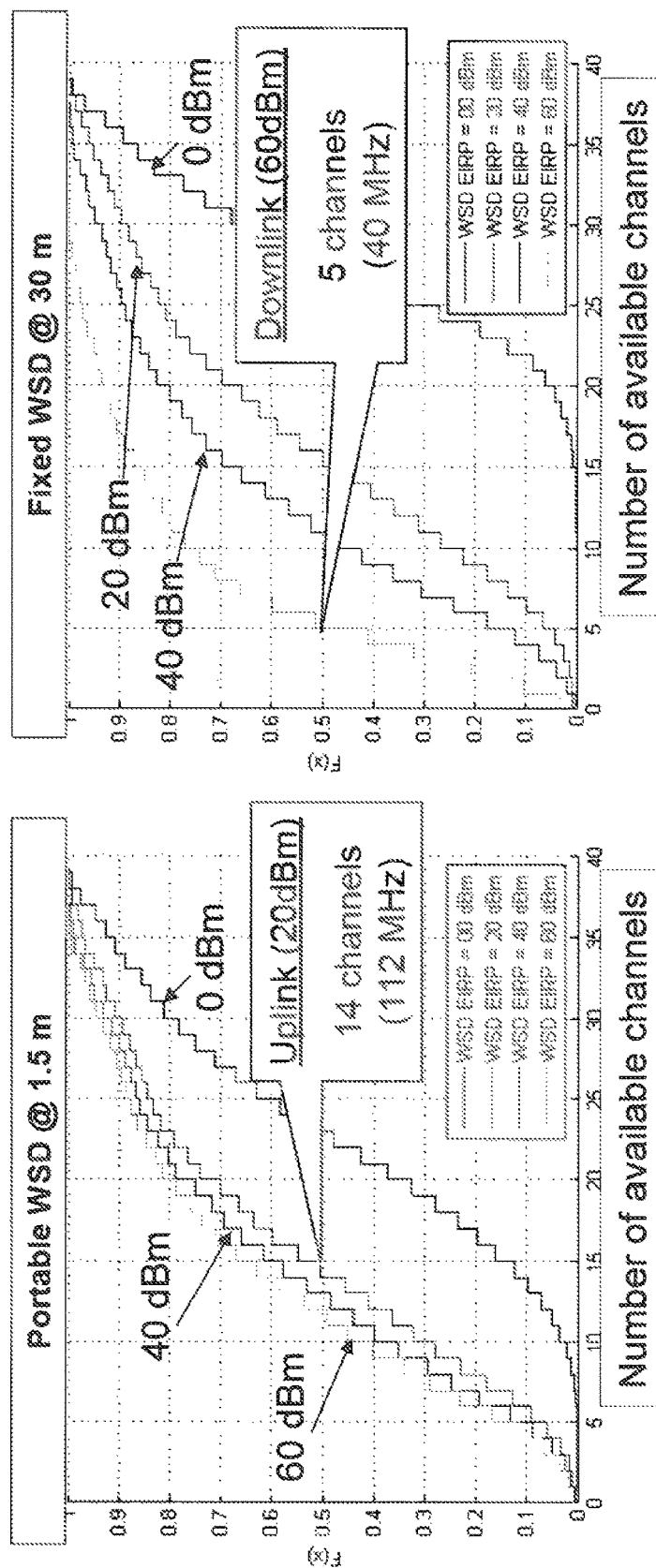

One commonality to the rules for TV white space in the US and in Europe is that one allowed way of discovering spectrum opportunities for secondary usage of the TV bands, is to access a control unit comprising a centrally managed database, sometimes referred to as a geo-location database unit. Upon a query from the WSD, the control unit provides the WSD with a list of TV channels available for secondary usage at the location of the WSD. The control unit thus controls the use of white space channels and has the authority of telling the WSD what transmissions that are allowed. The unit may also have access to all information required to perform the calculations of permitted WSD transmit power and related side constraints. Some examples of what information that may be comprised in the database of the control unit are:

Information regarding DTV transmitters, such as locations, transmit powers, and antenna diagrams;

Information regarding the propagation environment such as DTV channel models;

Information related to reference DTV receiver models, such as typical distances from WSD, and the protection ratio for the receivers (see FIG. 2).

The control unit is commonly a unit external to the WSD that may typically be accessed over the Internet, but it may also in principle be a unit within the WSD itself.

A method according to one exemplary embodiment for transmitting the first signal on a channel available for secondary usage is described hereinafter:

1. The WSD, which may be a UE or a base station, queries the external control unit for channels available for secondary usage. In the request for channels, the WSD includes the desired transmit power level for its first signal transmission. If the WSD needs more than one channel, the desired transmit power level may be different for the different channels. The link budget for additional DTV transmissions or parameters needed to estimate the interference generated in the primary wireless system may also be included in the request, as well as any other relevant information related to the WSDs capabilities to transmit DTV signals or its own WSD signals.
2. The control unit calculates the transmit power limits for all channels available for secondary usage by the WSD at the given WSD location and identifies the set of channels where the desired transmit power level for the respective channel may be permitted without the need for additional DTV transmissions by the WSD. If this set contains at least one channel, the database informs the WSD about the set of channels and the associated power limits, and proceeds with step 5 below. If the set is empty, the method continues in step 3 below.
3. The control unit may associate each channel available for secondary usage by the WSD at the given location with a unique index in the interval [1, N] where N is the number of channels available for secondary usage. The channels may be sorted, e.g., such that channels with higher indices have stricter transmit power limits than channels with lower indices. The power limits are determined in step 2.
4. For each of the channels available for secondary usage, starting with the channel with the least strict transmit power limit, the control unit identifies a further DTV channel, which is the DTV channel that sets the strictest limits on the WSD output power for the channel, i.e., the channel that most severely impacts the transmit power limit. This further DTV channel which is limiting the output power of the WSD s useful signal transmission is thus the channel where DTV receivers are most likely to be interfered by the WSD's signal transmission on the white space channel. The control unit calculates the required transmit power level for the WSD's transmission of a second signal on the further DTV channel. If the WSD transmits on the DTV channel at this required transmit power level, that DTV channel will not limit the WSD's ability to transmit its useful signal on the channel available for secondary usage at its desired transmit power level. Before doing the same procedure for even further DTV channels potentially limiting the WSD transmit power, it is checked if the WSD is capable of executing the transmissions. If the WSD is capable of executing the identified set of required DTV transmissions, and if there remain further DTV channels which limit the WSD's first signal output power, then the above procedure of computing the required transmit power level for the WSD's transmission of further second DTV signals is repeated. Finally, when no further limiting DTV channels remain, and provided the WSD is capable of executing the identified set of required DTV transmissions, the control unit informs the WSD of the required set of transmissions and the procedure continues to step 5. If the WSD is not able to execute the identified set of transmissions, e.g., due to hardware limitations, other channels available for secondary usage may be checked in the same way. If all channels available for secondary usage have been checked and the WSD isn't able to execute the identified set of transmissions, the control unit informs the WSD that there is no feasible transmission for it.
5. In the last step, the WSD may execute the transmission of the first WSD signal(s) and all additional DTV transmissions, if any, according to what was determined in step 4.

When the WSD starts transmitting on the channels available for secondary usage and on the further DTV channels, it is likely that it may not switch on its transmission at full power immediately. The reasons are that channel estimators in DTV receivers may not be able to cope with the step change in the experienced DTV channel that such a sudden WSD transmission would mean, as new taps would more or less instantly appear in the channel. The sudden change in the total received power may also drive the DTV receiver into saturation. Hence, a so called soft introduction is likely needed where the output power is gradually increased up to the desired power. The speed of this gradual increase may be derived if it is approximately known what change in the channel that the DTV receivers may tolerate. This would result in a light delay in setting up the channel usage. However, other delays will be present in the white space system anyway, and the soft introduction will better protect the primary users on the adjacent channels. The same type of effect will be present when the WSD decides to leave the channel. If the transmission is abruptly ceased the DTV channel will again experience a step change which could cause problems to the DTV receivers.

Therefore, also a soft evacuation of the DTV channel may be needed.

As an advanced WSD which can transmit on at least two frequency channels is needed, the disclosure is better suited for base station-like WSDs since regular DTV SFN transmitters connected to the same antennas as the WSD may then be used. Furthermore, the DTV signal information must be forwarded to the WSD. Information caching may be used if the DTV programs are not live transmissions. In one embodiment, the DTV data is transmitted during periods of low backhaul load. This is possible since today's DTV SFN transmitters are able to receive the information and synchronize their transmissions with the other DTV transmitters.

Figure 4A:
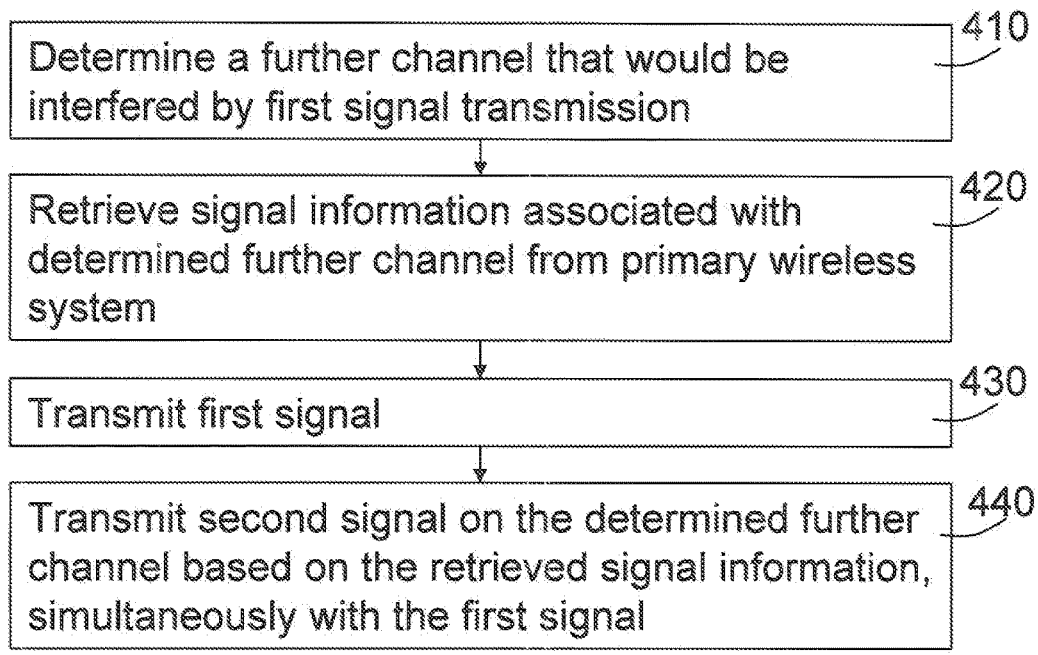
FIGS. 4a-4b are flowcharts of the method performed by the WSD according embodiments.

FIG. 4a is a flowchart of a method in a WSD of a secondary wireless system, for transmitting a first signal, i.e. the WSD useful signal, on a channel available for secondary usage allocated to a primary wireless system, according to embodiments. The WSD may be a UE, or a base station-like device in e.g. LTE. The primary wireless system may be a DTV system as in the example described above. The method comprises:

410: Determining a further channel used by the primary wireless system, that would be interfered by a transmission of the first signal on the channel available for secondary usage. As described above, this could be the channel that limits the most the output power of the transmission on the channel available for secondary usage. There may also be more than one further limiting channel.

420: Retrieving signal information associated with the determined further channel from the primary wireless system. The WSD needs to retrieve this signal information over backhaul transmission, in order to be able to transmit the primary system signal in step 440 below.

430: Transmitting the first signal on the channel available for secondary usage.

440: Transmitting a second signal on the determined further channel based on the retrieved signal information, simultaneously with the first signal on the channel available for secondary usage. As the WSD transmits the first useful signal at the same time as the second primary wireless system signal, the interference generated in the primary wireless system by the first signal transmission is compensated for by the second signal transmission. If there is more than one limiting channel, then the corresponding information associated to those channels is also transmitted on these other limiting channels.

In particular embodiments, the signal information associated with the determined further channel is retrieved from the primary wireless system during a period of low backhaul load, and is stored in a memory for later usage. As described above, this is possible if there are no real time requirements for the primary system signal.

Figure 4B:
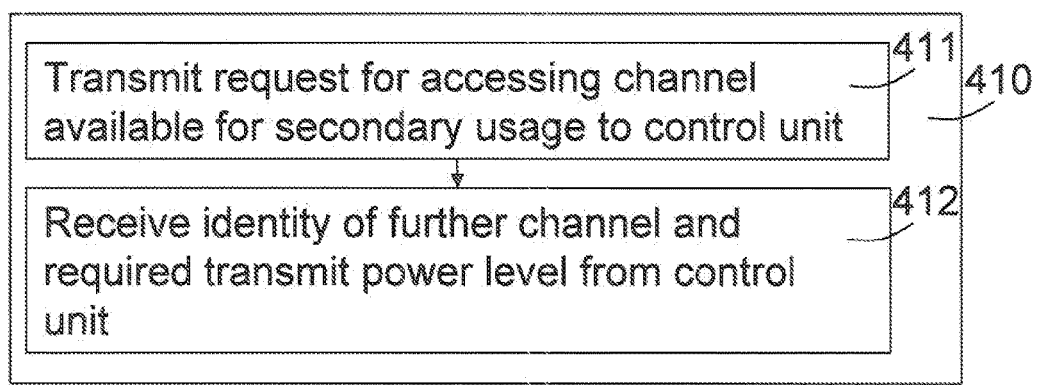

FIG. 4b is a flowchart illustrating the step 410 of determining described above according to one embodiment. According to this embodiment, the determining 410 of the further channel comprises:

411: Transmitting a request for accessing the channel available for secondary usage to a control unit. The request comprises at least one of: parameters for estimating the interference generated in the primary wireless system by the first signal transmission; parameters related to a transmitting capability of the white space device; and a desired transmit power level for the first signal transmission. The WSD may thus indicate that it desires to use a certain transmit power level, and the control unit may then use this input to see what channels that will be interfered by such a transmission from the WSD, as will be explained hereinafter.

412: Receiving information related to the further channel from the control unit in response to the transmitted request. The received information comprises an identity of the further channel and a required transmit power level for the second signal transmission on the further channel. The control unit thus returns the information that the WSD needs to be able to transmit its own useful signal with the desired transmit power.

As described above, a so called soft introduction is likely needed for the second signal transmission. In one embodiment, the WSD will when transmitting 430, 440 the first and second signals gradually increase the transmission power up to the desired and required transmit power levels respectively.

Figure 5:
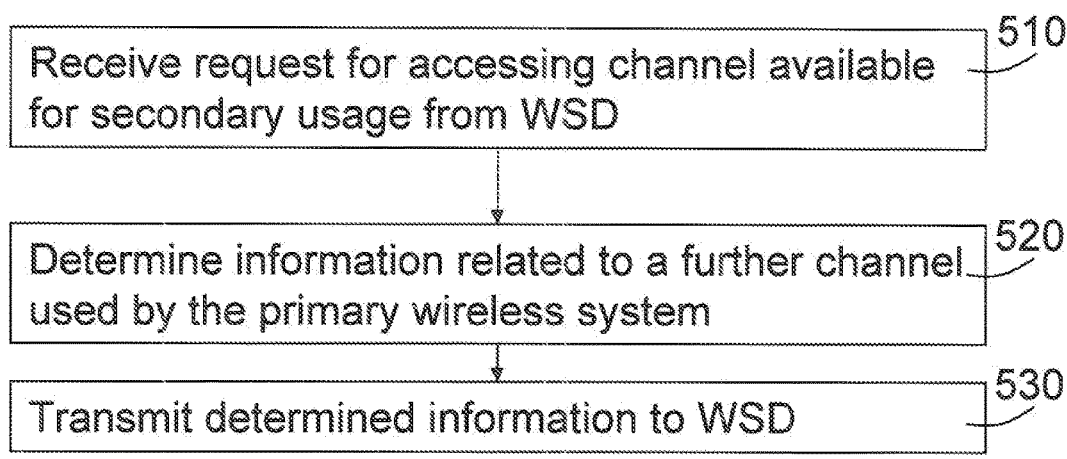
FIG. 5 is a flowchart of the method performed by the control unit according to embodiments.

FIG. 5 is a flowchart of the method in a control unit for supporting a white space device transmitting a first signal on a channel available for secondary usage allocated to a primary wireless system, according to an embodiment. In particular embodiments, the control unit may be integrated with the WSD, while another solution would be to have the control unit as an external node. It may e.g. be a geo-location database unit. The method in the control unit comprises:

510: Receiving a request for accessing the channel available for secondary usage from the WSD. The request comprises at least one of: parameters for estimating the interference generated in the primary wireless system by the first signal transmission; parameters related to a transmitting capability of the WSD; and a desired transmit power level for the first signal transmission.

520: Determining information related to a further channel used by the primary wireless system, wherein the further channel would be interfered by the first signal transmission on the channel available for secondary usage. The information is determined based on the received request and on parameters related to the primary wireless system available in the control unit. These parameters may be obtained from regulatory rules or be directly based on the primary wireless system deployment and properties. The information comprises an identity of the further channel and a required transmit power level for a second signal transmission on the further channel.

530: Transmitting the determined information to the WSD.

Figure 6A:
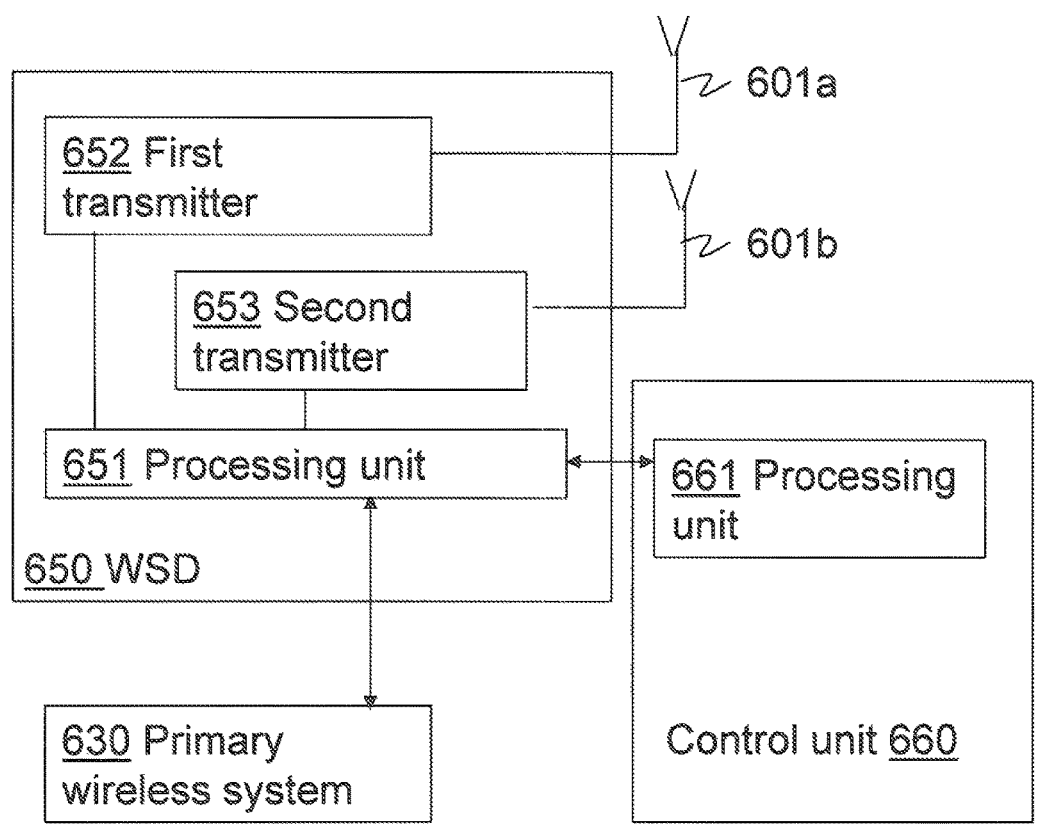
FIGS. 6a-6b are block diagrams illustrating the WSD and the control unit according to embodiments.

FIG. 6a is a schematic block diagram of an embodiment of the WSD 650 and the control unit 660. The WSD 650 is configured to be used in a secondary wireless system, and to transmit a first signal on a channel available for secondary usage allocated to a primary wireless system. The WSD 650 comprises two transmit antennas 601a and 601b, but may comprise further antennas as well, such as multiple transmit antennas, and receive antennas. The two antennas may also be combined into one single antenna. The WSD 650 also comprises a processing unit 651 configured to determine a further channel used by the primary wireless system, that would be interfered by a transmission of the first signal on the channel available for secondary usage. The processing unit 651 is also configured to retrieve signal information associated with the determined further channel from the primary wireless system. The WSD 650 furthermore comprises a first transmitter 652 for transmitting the first signal on the channel available for secondary usage. It also comprises a second transmitter 653 for transmitting a second signal on the determined further channel based on the retrieved signal information, simultaneously with the first signal on the channel available for secondary usage, such that interference generated in the primary wireless system by the first signal transmission is compensated for by the second signal transmission. The above described antennas 601a and 601b may be used for the transmission of the first and second signal respectively. The processing unit 651 may in embodiments also be configured to retrieve and store signal information associated with the determined further channel during a period of low backhaul load.

Optionally, the processing unit 651 may be further configured to transmit a request for accessing the channel available for secondary usage to the control unit 660. The request comprises at least one of: parameters for estimating the interference generated in the primary wireless system by the first signal transmission; parameters related to a transmitting capability of the white space device; and a desired transmit power level for the first signal transmission. The processing unit is in this embodiment also configured to receive information related to the further channel from the control unit 660 in response to the transmitted request. The received information comprises an identity of the further channel and a required transmit power level for the second signal transmission on the further channel. One or more communication ports may be comprised in the WSD for the purpose of transmitting requests to the control unit and for receiving the response from the control unit.

In particular embodiments, the first and second transmitters 652, 653 may be configured to transmit the first and second signals by gradually increasing a transmission power up to the desired and required transmit power levels respectively. This is to avoid the step change for the primary wireless system receivers.

The control unit 660 also illustrated in FIG. 6a, is configured to support a WSD 650 transmitting a first signal on a channel available for secondary usage allocated to a primary wireless system 630. The control unit may in particular embodiments be a gee-location database. It may alternatively be integrated within the WSD. The control unit 660 comprises a processing unit 861 configured to receive a request for accessing the channel available for secondary usage from the white space device. The request comprises at least one of: parameters for estimating the interference generated in the primary wireless system by the first signal transmission; parameters related to a transmitting capability of the white space device; and a desired transmit power level for the first signal transmission. The processing unit 661 is also configured to determine information related to a further channel used by the primary wireless system, wherein the further channel would be interfered by the first signal transmission on the channel available for secondary usage. The information is determined based on the received request and on parameters related to the primary wireless system available in the control unit, and the information comprises an identity of the further channel and a required transmit power level for a second signal transmission on the further channel. The processing unit is also configured to transmit the determined information to the WSD. There may be one or more conventional input and output ports in the control unit for receiving requests from the WSD, e.g. over the Internet, and for transmitting the determined information to the WSD.

The units described above with reference to FIG. 6a are logical units and do not necessarily correspond to separate physical units.

Figure 6B:
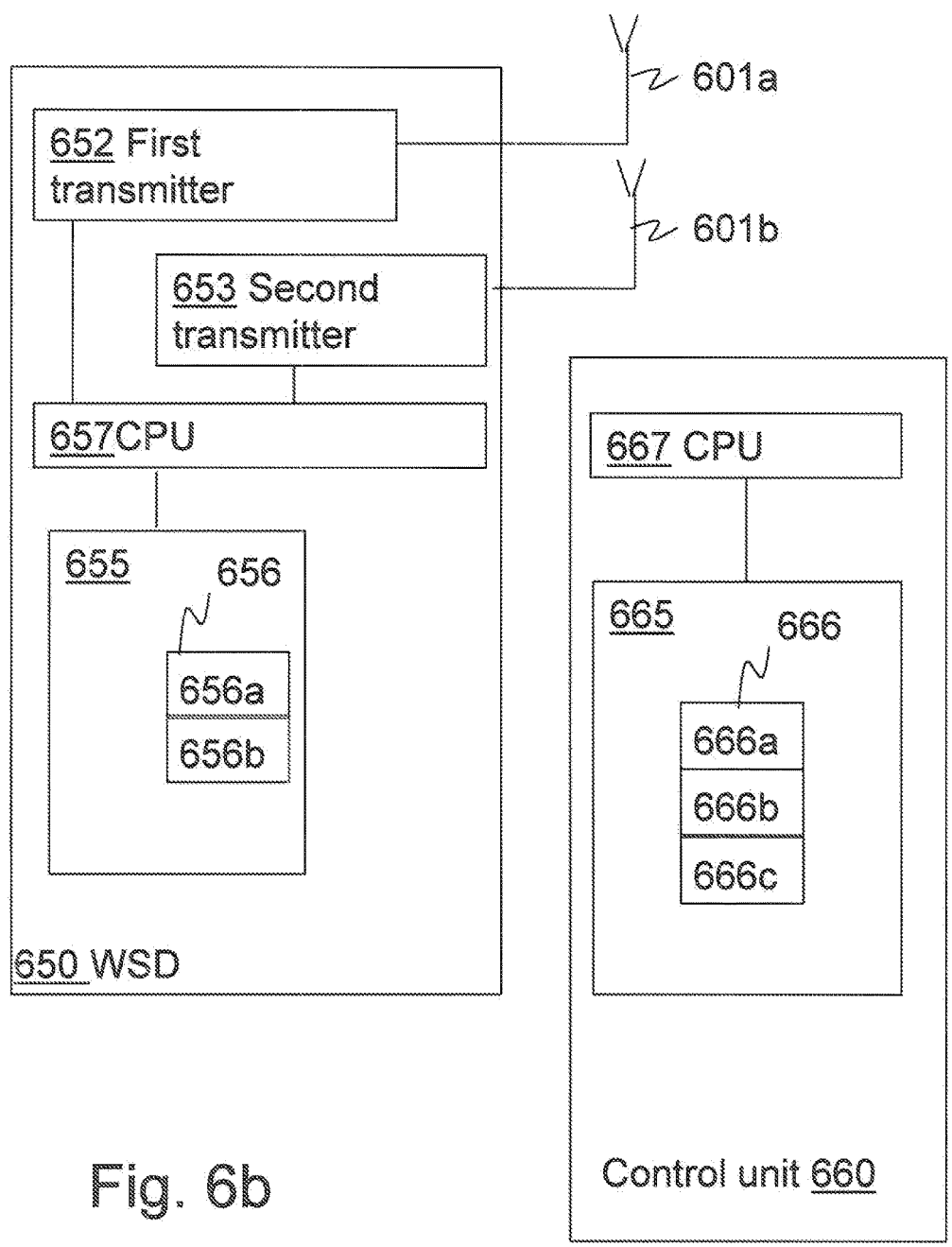

FIG. 6b schematically illustrates an embodiment of the WSD 650 and the control unit 660, which is an alternative way of disclosing the embodiment illustrated in FIG. 6a. The WSD 650 comprises the first and second transmit units 653 and 654 and antennas 601a, 601b already described above with reference to FIG. 6a. The WSD 650 also comprises a Central Processing Unit (CPU) 657 which may be a single unit or a plurality of units. Furthermore, the WSD 650 comprises at least one computer program product 655 in the form of a non-volatile memory, e.g. an EEPROM (Electrically Erasable Programmable Read-Only Memory), a flash memory or a disk drive. The computer program product 655 comprises a computer program 656, which comprises code means which when run on the WSD 650 causes the CPU 657 on the WSD 650 to perform the steps of the procedures described earlier in conjunction with FIG. 4a.

Hence in the embodiments described, the code means in the computer program 656 of the WSD 650 comprises a module 656a for determining a further channel that would be interfered by a transmission of the first signal on the channel available for secondary usage. The computer program 656 also comprises a module 656b for retrieving signal information associated with the determined further channel from the primary wireless system. The code means may thus be implemented as computer program code structured in computer program modules. The modules 656a-b essentially perform the steps of the flow in FIG. 4a to emulate the WSD described in FIG. 6a. In other words, when the different modules 656a-b are run on the CPU 657, they correspond to the processing unit 651 of FIG. 6a.

FIG. 6b also schematically illustrates an embodiment of the control unit 660, which is an alternative way of disclosing the embodiment illustrated in FIG. 6a. The control unit 660 also comprises a CPU 667 which may be a single unit or a plurality of units. Furthermore, the control unit 660 comprises at least one computer program product 665 in the form of a non-volatile memory, e.g. an EEPROM (Electrically Erasable Programmable Read-Only Memory), a flash memory or a disk drive. The computer program product 665 comprises a computer program 666, which comprises code means which when run on the control unit 660 causes the CPU 667 on the control unit 660 to perform the steps of the procedures described earlier in conjunction with FIG. 5a.

Hence in the embodiments described, the code means in the computer program 666 of the control unit 660 comprises a module 666a for receiving a request for accessing the channel available for secondary usage from the WSD. The computer program 666 also comprises a module 666b for determining information related to a further channel that would be interfered by the first signal transmission on the channel available for secondary usage, and a module 666c for transmitting the determined information to the WSD. The code means may thus be implemented as computer program code structured in computer program modules. The modules 666a-c essentially perform the steps of the flow in FIG. 5a to emulate the control unit described in FIG. 6a. In other words, when the different modules 666a-c are run on the CPU 667, they correspond to the processing unit 661 of FIG. 6a.

Although the code means in the embodiments disclosed above in conjunction with FIG. 6b are implemented as computer program modules, one or more of the code means may in alternative embodiments be implemented at least partly as hardware circuits.

The above mentioned and described embodiments are only given as examples and should not be limiting. Other solutions, uses, objectives, and functions within the scope of the accompanying patent claims may be possible.

The invention claimed is:

1. A method in a white space device of a secondary wireless system, for transmitting a first signal on a channel available for secondary usage allocated to a primary wireless system, the method comprising:

determining a further channel used by the primary wireless system, that would be interfered by a transmission of the first signal on the channel available for secondary usage, retrieving signal information associated with the determined further channel from the primary wireless system, transmitting the first signal on the channel available for secondary usage, and transmitting a second signal on the determined further channel based on the retrieved signal information, simultaneously with the first signal on the channel available for secondary usage, such that an interference generated in the primary wireless system by the first signal transmission is compensated for by the second signal transmission.

2. The method according to claim 1, wherein the signal information associated with the determined further channel is retrieved and stored during a period of low backhaul load.

3. The method according to claim 1, wherein determining the further channel comprises:

transmitting a request for accessing the channel available for secondary usage to a control unit, the request comprising at least one of: parameters for estimating the interference generated in the primary wireless system by the first signal transmission; parameters related to a transmitting capability of the white space device; and a desired transmit power level for the first signal transmission; and receiving information related to the further channel from the control unit in response to the transmitted request, the received information comprising an identity of the further channel and a required transmit power level for the second signal transmission on the further channel.

4. The method according to claim 3, wherein transmitting the first and second signals comprises gradually increasing a transmission power up to the desired and required transmit power levels respectively.

5. The method according to claim 3, wherein the white space device comprises the control unit.

6. A method in a control unit for supporting a white space device transmitting a first signal on a channel available for secondary usage allocated to a primary wireless system, the method comprising:
 receiving a request for accessing the channel available for secondary usage from the white space device, the request comprising at least one of: parameters for estimating the interference generated in the primary wireless system by the first signal transmission; parameters related to a transmitting capability of the white space device; and a desired transmit power level for the first signal transmission;
 determining information related to a further channel used by the primary wireless system, wherein the further channel would be interfered by the first signal transmission on the channel available for secondary usage, the information being determined based on the received request and on parameters related to the primary wireless system available in the control unit, and the information comprising an identity of the further channel and a required transmit power level for a second signal transmission by the white space device on the further channel to compensate for interference caused on the further channel by the first signal transmission, and
 transmitting the determined information to the white space device.

7. The method according to claim 6, wherein the control unit is a geo-location database unit.

8. A white space device configured to be used in a secondary wireless system, and to transmit a first signal on a channel available for secondary usage allocated to a primary wireless system, the white space device comprising:
 a processing unit configured to:
  determine a further channel used by the primary wireless system, that would be interfered by a transmission of the first signal on the channel available for secondary usage, and
  retrieve signal information associated with the determined further channel from the primary wireless system,
 a first transmitter for transmitting the first signal on the channel available for secondary usage, and
 a second transmitter for transmitting a second signal on the determined further channel based on the retrieved signal information, simultaneously with the first signal on the channel available for secondary usage, such that an interference generated in the primary wireless system by the first signal transmission is compensated for by the second signal transmission.

9. The white space device according to claim 8, wherein the processing unit is configured to retrieve and store signal information associated with the determined further channel during a period of low backhaul load.

10. The white space device according to claim 8, wherein the processing unit is further configured to:
 transmit a request for accessing the channel available for secondary usage to a control unit, the request comprising at least one of: parameters for estimating the interference generated in the primary wireless system by the first signal transmission; parameters related to a transmitting capability of the white space device; and a desired transmit power level for the first signal transmission; and
 receive information related to the further channel from the control unit in response to the transmitted request, the received information comprising an identity of the further channel and a required transmit power level for the second signal transmission on the further channel.

11. The white space device according to claim 10, wherein the first and second transmitters are configured to transmit the first and second signals by gradually increasing a transmission power up to the desired and required transmit power levels respectively.

12. The white space device according to claim 10, wherein the white space device comprises the control unit.

13. An apparatus operative as a control unit configured to support a white space device transmitting a first signal on a channel available for secondary usage allocated to a primary wireless system, the apparatus comprising:
 interface circuitry configured to receive a request for accessing the channel available for secondary usage from the white space device, the request comprising at least one of: parameters for estimating the interference generated in the primary wireless system by the first signal transmission; parameters related to a transmitting capability of the white space device; and a desired transmit power level for the first signal transmission; and
 processing circuitry configured to:
  determine information related to a further channel used by the primary wireless system, wherein the further channel would be interfered by the first signal transmission on the channel available for secondary usage, the information being determined based on the received request and on parameters related to the primary wireless system available in the control unit, and the information comprising an identity of the further channel and a required transmit power level for a second signal transmission by the white space device on the further channel to compensate for interference caused on the further channel by the first signal transmission, and
  transmit the determined information to the white space device, via the interface circuitry.

14. The apparatus according to claim 13, wherein the apparatus is configured as a geo-location database unit.

* * * * *